United States Patent
Leins et al.

(10) Patent No.: US 6,749,342 B1
(45) Date of Patent: Jun. 15, 2004

(54) BEARING SYSTEM, ESPECIALLY FOR YARN FEED DEVICES

(75) Inventors: Eberhard Leins, Horb (DE); Hermann Schmodde, Horb-Dettlingen (DE); Attila Horvath, Freudenstadt (DE)

(73) Assignee: Memminger-IRO GmbH, Dornstetten (DE)

( * ) Notice: Subject to any disclaimer, the term of this patent is extended or adjusted under 35 U.S.C. 154(b) by 124 days.

(21) Appl. No.: 10/030,800

(22) PCT Filed: Jul. 6, 2000

(86) PCT No.: PCT/DE00/02206

§ 371 (c)(1),
(2), (4) Date: Mar. 28, 2002

(87) PCT Pub. No.: WO01/04399

PCT Pub. Date: Jan. 18, 2001

(30) Foreign Application Priority Data

Jul. 12, 1999 (DE) ............................... 199 32 485

(51) Int. Cl.[7] ................................................ F16C 27/00
(52) U.S. Cl. ...................................................... 384/536
(58) Field of Search ................................ 384/535, 536, 384/581, 582; 66/132 T; 242/365.6

(56) References Cited

U.S. PATENT DOCUMENTS

| 3,050,352 A | * | 8/1962 | Moxley ...................... 384/536 |
| 3,447,846 A | * | 6/1969 | Marsh ........................ 384/536 |
| 3,885,840 A | * | 5/1975 | Neder ........................ 384/536 |
| 3,890,854 A | * | 6/1975 | Pitner .......................... 74/492 |
| 4,022,515 A |   | 5/1977 | Hermanns et al. |
| 4,059,240 A | * | 11/1977 | Laursen ................... 242/364.7 |
| 4,611,933 A |   | 9/1986 | Hofmann et al. |
| 4,643,644 A | * | 2/1987 | Colliver et al. ............. 416/174 |
| 5,044,785 A | * | 9/1991 | Bair et al. .................. 384/536 |
| 5,059,042 A | * | 10/1991 | Grierson .................... 384/537 |
| 5,716,024 A |   | 2/1998 | Kaufmann et al. |
| 5,860,298 A |   | 1/1999 | Chen |

FOREIGN PATENT DOCUMENTS

FR 1 029 525 A 6/1953

* cited by examiner

Primary Examiner—Thomas R. Hannon
(74) Attorney, Agent, or Firm—Leydig, Voit & Mayer, Ltd.

(57) ABSTRACT

The bearing device is formed of a bearing seat, a roller bearing, and a squeeze element. The squeeze element rests over a large surface area on the outer ring of the roller bearing and rests only regionally on corresponding regions of the bearing seat. The regions are preferably linear or striplike and are oriented substantially axially. This facilitates the insertion and removal of the roller bearing into and out of the bearing seat and prevents rotation of the outer bearing ring even if the bearing seats are provided with relatively generous tolerances.

24 Claims, 6 Drawing Sheets

BEARING SYSTEM, ESPECIALLY FOR YARN FEED DEVICES

FIELD OF THE INVENTION

The invention relates to a bearing device, particularly intended for use in textile industry equipment, such as yarn feeders.

BACKGROUND OF THE INVENTION

Textile industry equipment, yarn feeders or the like often have rotatably supported shafts or similar elements, with which other elements, such as yarn guide drums or the like, must be precisely supported. Relatively stringent demands commonly are made of the precision of the bearing. Furthermore, the bearings usually must be smooth-running. Preceding transmission elements, such as toothed belts or other belts, often have a relatively high resilience. If the bearings do not run smoothly constantly, then elements operatively connected to the bearings, may run unevenly, which usually cannot be tolerated.

While the demands made for bearing precision are high, still textile industry devices generally must be easy to assemble and maintain. Often, parts or housings also are made of plastic, which can shrink or swell as a consequence of aging or environmental factors (i.e., such as moisture or temperature), and furthermore, plastic parts always are subject to certain tolerances in production. Such tolerances and time- or ambient-dictated dimensional changes should not, of course, lead to a functional impairment of such devices.

From U.S. Pat. No. 5,860,298, for instance, a yarn feeder is known, in which a vertically oriented shaft is rotatably supported on a basic retainer. For bearing purposes, two ball bearings are provided, which are received in suitable cylindrical pockets of the basic carrier. The bearing seat has to adhere to close tolerances, in order to assure a good seating of the outer bearing ring. Installing and removing the bearings usually is not readily possible.

From European Patent Disclosure EP 0 742 304 A1, a yarn delivery apparatus with a horizontally divided housing is known, in which a plurality of horizontally disposed shafts that pass through the housing wall are rotatably supported. In the housing wall, bearing seats are formed, which are penetrated by the dividing seam formed between the two halves of the housing. Adaptation to production tolerances or other dimensional fluctuations is accomplished by the inherent resilience of the housing material, in conjunction with an only regional contact of the outer bearing ring with the corresponding faces of the bearing seat, by an O-ring disposed between the outer bearing ring and the bearing seat, or by special elastically resilient spring elements in the bearing seat. In this yarn feeder, the bearings are inserted from the dividing seam of the housing into the appropriate pockets with the housing open. The bearing is then firmly clamped between the housing parts. The construction is not very vulnerable to tolerances, but does require a housing seam that passes through the bearing seat.

OBJECTS AND SUMMARY OF THE INVENTION

It is an object of the invention to provide a bearing device, particularly for textile industry equipment, such as yarn feeders, which are not vulnerable to tolerances and in which the bearing can remain undivided, that is, can be in one piece.

The bearing device according to the invention has a bearing seat, which defines a receiving chamber for a roller bearing and a squeeze element. The squeeze element is squeezed together at regions spaced apart from one another, so that material of the squeeze element is positively displaced out of the squeeze zones. Regardless of any tolerances of the bearing seat, the squeeze element secures the roller bearing nonrotatably in the bearing seat and at the same time makes it possible for the roller bearing to be inserted easily into the bearing seat. If needed, the bearing seat can therefore be made in undivided fashion.

The squeeze element can be in the form of a closed ring or as a striplike element that is put together to form a ring. It is preferably made of an elastomer. It can have either a uniform thickness throughout or locally thickened regions. Thus the squeeze zones can be defined by the shape of the bearing seat or the shape of the squeeze element. The deformation of the squeeze element locally reduces its thickness by positively displacing material. For compensation, its thickness increases in the vicinity of the compressed or squeezed region.

If the squeeze elements have thickened portions, then the bearing seat can be formed cylindrically. If the squeeze elements are uniformly thick, then the shape of the bearing seat is other than circular, so that the spacing from the roller bearing is not uniform along the circumference.

To that end, the bearing seat can be shaped polygonally or in other ways, for instance being provided with protrusions in the direction of the roller bearing. In one embodiment, the receiving chamber has ribs extending substantially parallel to the pivot axis of the roller bearing. On their side toward the roller bearing, the ribs have end faces that are located on a circle which is somewhat greater than the circle defined by the outer bearing ring of the roller bearing. Thus between the end faces and the cylindrical outer face of the roller bearing, a play arises, which is filled up by a squeeze element. This element is placed radially outward on the end faces of the ribs, while it is braced radially inward on the outer face of the outer ring. The squeeze element adjusts to the actual play present so that deviations in shape and dimension of the bearing seat and dimensional changes caused by aging, down to the range of a tenth of a millimeter, do not impair the seating of the roller bearing. Because the squeeze element contacts the ribs only in strips, the roller bearing, moreover, can be pressed with only slight impression forces axially into the bearing seat and removed from it again as needed. The squeeze element preferably rests over a large surface area on the outer face of the roller bearing so that it can be inserted with the roller bearing into the bearing seat. The static friction between the outer ring and the squeeze element prevents the squeeze element from displacement counter to the outer ring, while conversely it slides easily along the ribs, with which it has only a narrow striplike contact. This not only facilitates installation and removal but also prevents an axial warping of the roller bearing. Once the roller bearing is seated in the bearing seat, its outer ring is reliably secured against rotation. Moreover, the squeeze element cushions the outer bearing ring against the housing and compensates for deviations in shape of the bearing seat.

The receiving chamber preferably is open axially to one side to allow access to the roller bearing. If needed, the receiving chamber can be closed with a cover element.

The ribs are preferably relatively narrow, and they are disposed at a comparatively wide spacing from one another. This makes it possible for the bearings, provided with squeeze elements, to be inserted axially with only slight force into the bearing seats, yet even so a secure, precise seat of the bearing is always attained.

It is advantageous if the gaps or recesses between the ribs have a greater volume than the volume of the applicable portion of the squeeze element to be received. On the side toward the seat, the bearing is supported essentially only via the ribs. The squeeze element distributes the striplike or linear load to a somewhat larger area on the outer circumference of the roller bearing.

On the side toward the roller bearing, the ribs can have an edge or a narrow bearing face. This edge or face may be plane or curved. It is expedient to attempt to attain only a narrow linear or striplike contact face between the squeeze element and the rib. Because axial mounting is possible, the bearing seat need not have a dividing seam. The clamping force with which the bearing is retained in the bearing seat thus can be brought to bear and generated independently of fastening elements, which for instance hold housing parts together. The bearing seat may be closed and seamless.

The squeeze elements furthermore allow a certain change of angle of the bearings, so that it is readily possible to provide bearing seats for bearings of a shaft on different housing parts. Centering means preferably can be provided, which at least approximately assure an alignment of the bearing seats.

The squeeze regions can be disposed at equal circumferential intervals. If a load absorbing preferential direction is desired, then the spacings also can be defined as unequal, for instance being placed closer together in the load-absorbing direction.

Other objects and advantages of the invention will become apparent upon reading the following detailed description and upon reference to the drawings, in which:

Figure 1:
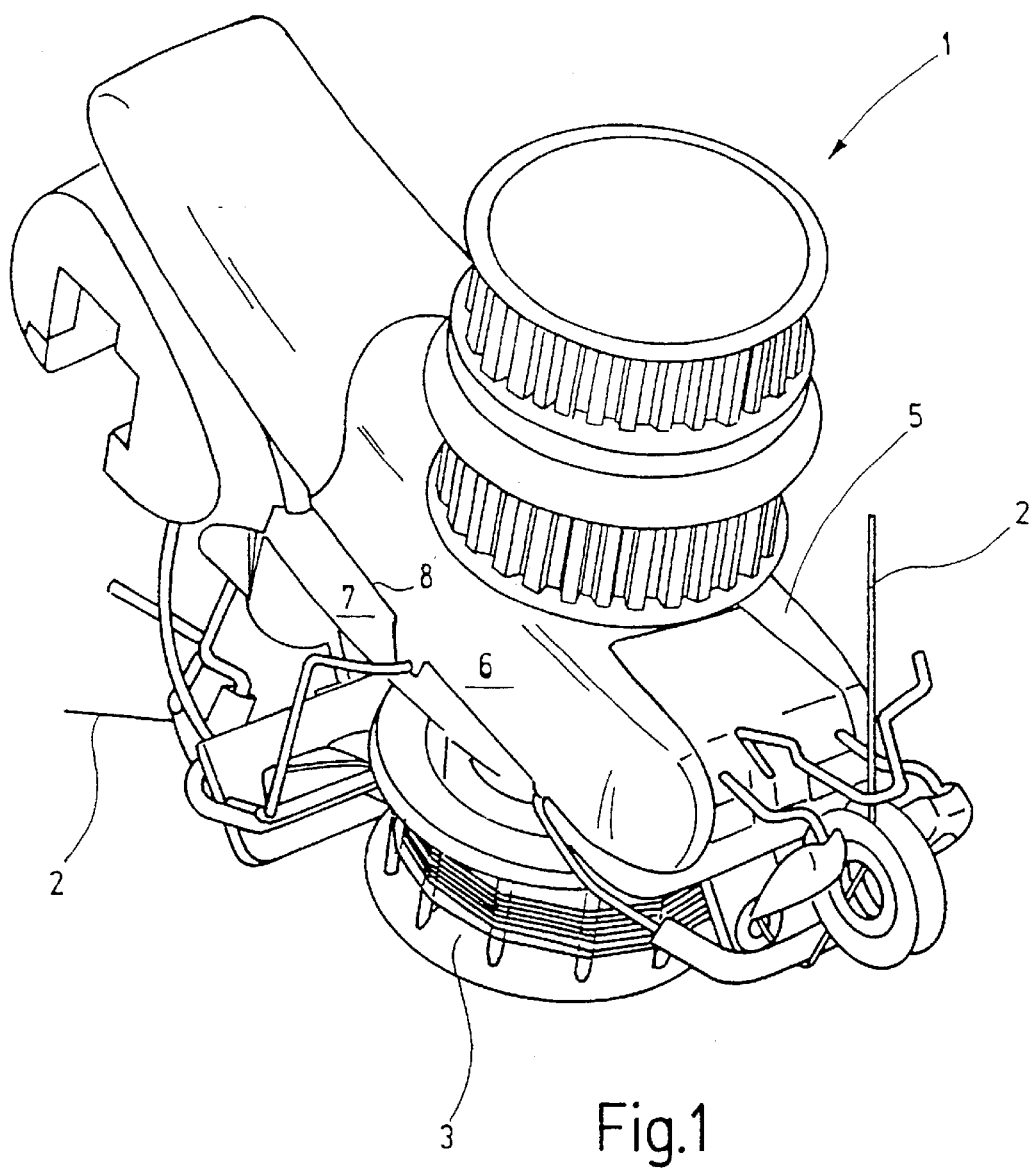
FIG. 1 is a perspective of an illustrative yarn feeder having a drive shaft with a bearing support in accordance with the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DESCRIPTION OF THE PREFERRED EMBODIMENTS

Figure 2:
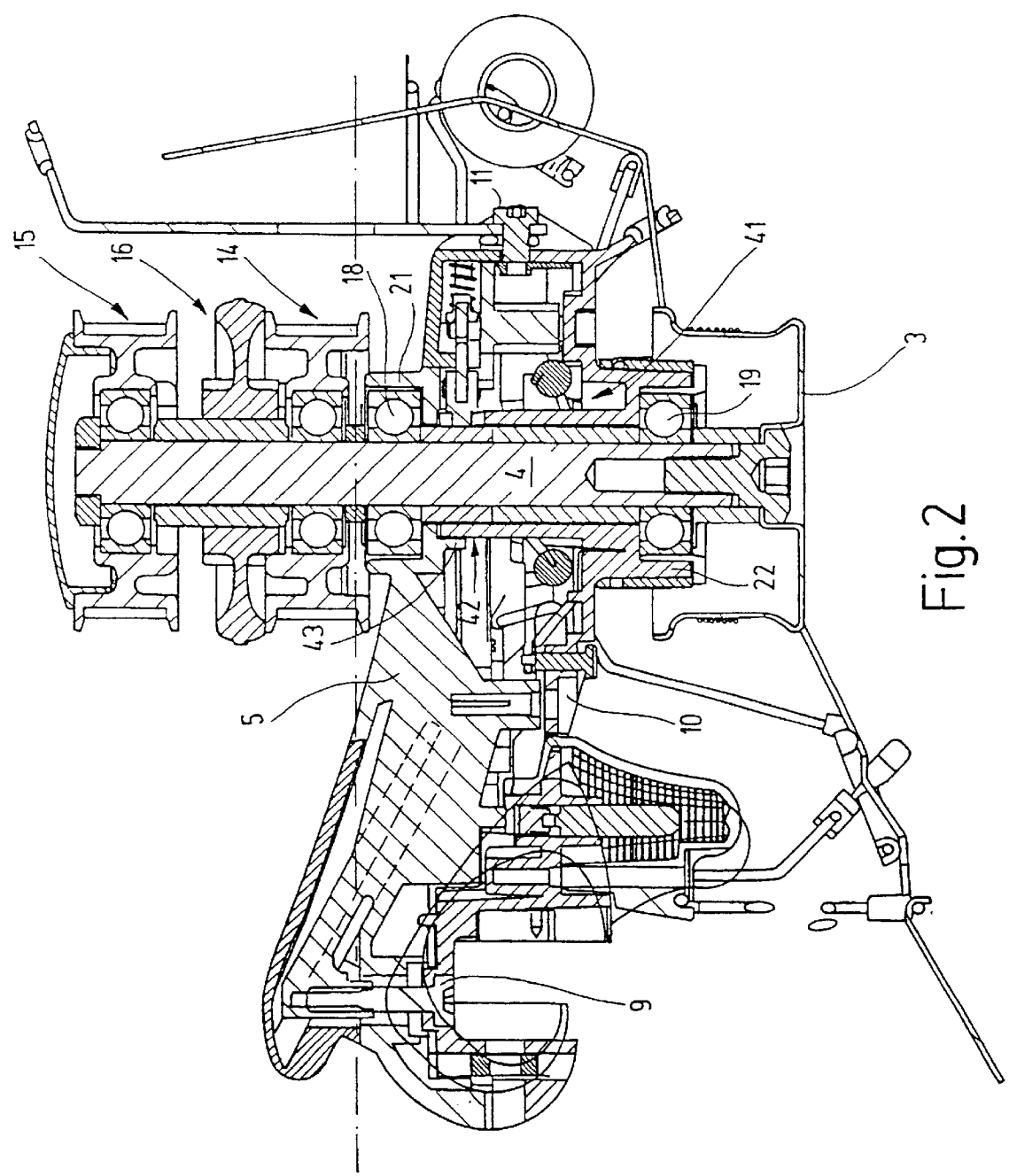
FIG. 2 is a vertical section of the yarn feeder shown in FIG. 1.

Referring now more particularly to FIGS. 1 and 2 of the drawings, there is shown an illustrative yarn feeder 1 embodying the present invention being used for delivering a yarn 2 to a textile machine. To that end, the yarn feeder 1 has a yarn guide drum 3, which is supported by a shaft 4 (FIG. 2). The shaft 4 is rotatably supported on a basic carrier 5, which in this instance is embodied as a two-shell housing. The basic carrier 5 includes an upper housing part 6 and a lower housing part 7, which adjoin one another and are held together at a dividing seam 8. To that end, fastening means such as screws 9,10, 11 visible in FIG. 2 are provided. The shaft 4, on its end remote from the yarn guide drum 3, is provided with two drive disks 14, 15, which are rotatably supported on the shaft 4 and can be coupled to the shaft 4 in a manner fixed against relative rotation as needed via a coupling disk 16 for driving the shaft 4 and the yarn guide drum 3 supported thereon.

Figure 3:
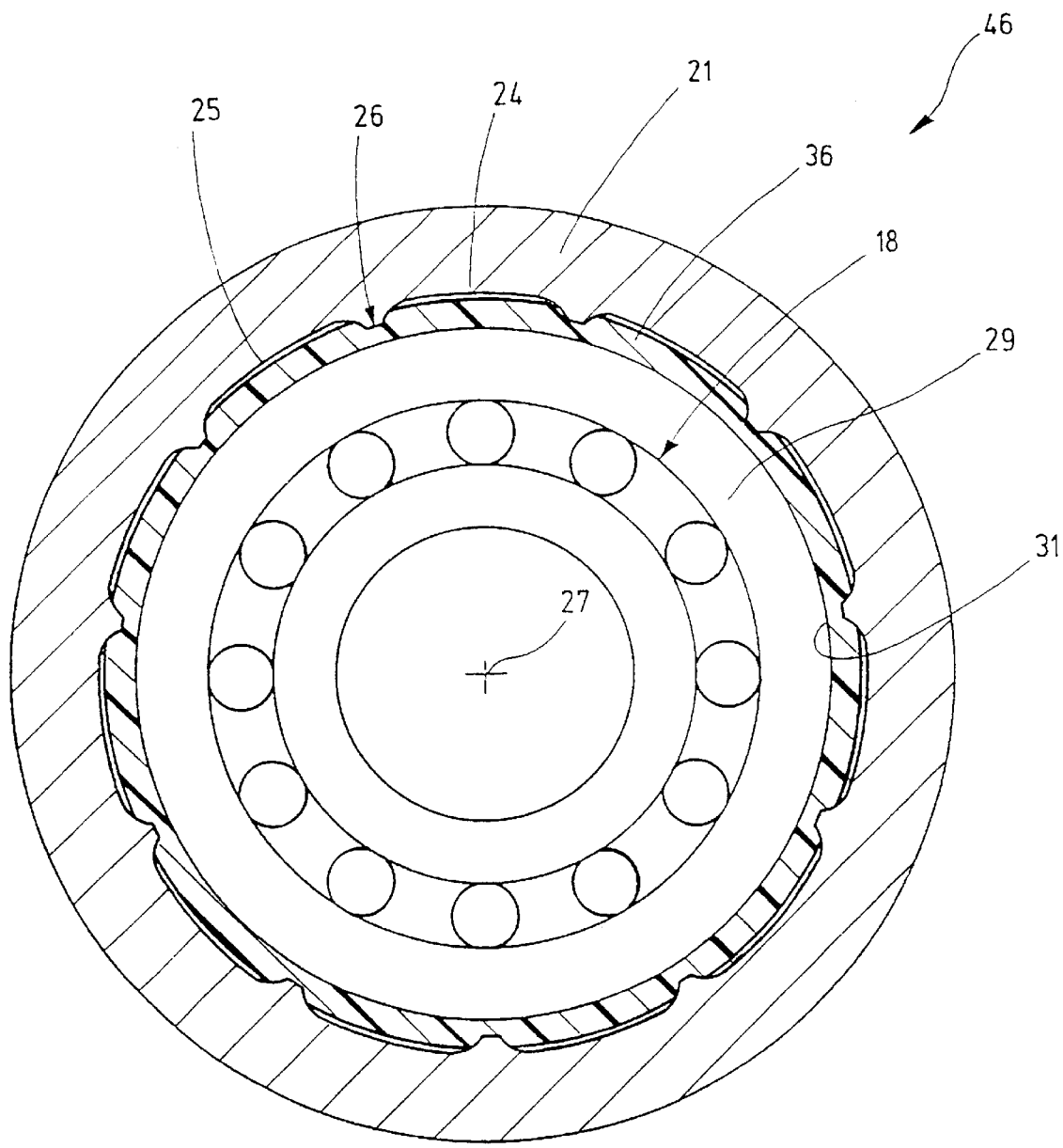
FIG. 3 is an enlarged transverse section of one of the bearings for the yarn feeder drive shaft, showing a bearing seat and squeeze element in accordance with the invention.

For rotatably supporting the shaft 4, two ball bearings 18, 19 are provided, one of which is retained by the upper housing part 6 and the other by the lower housing part 7. To that end, respective bearing seats 21, 22 in the form of shallow, approximately cylindrical pockets are formed in the housing parts 6, 7. The bearing seats 21, 22 in this case are formed by tubular protrusions or extensions on the housing parts 6, 7. The bearing seat 21 is particularly shown in FIG. 3. The bearing seat 22 is structurally identical so that the description below applies accordingly to it as well.

Figures 4, 5:
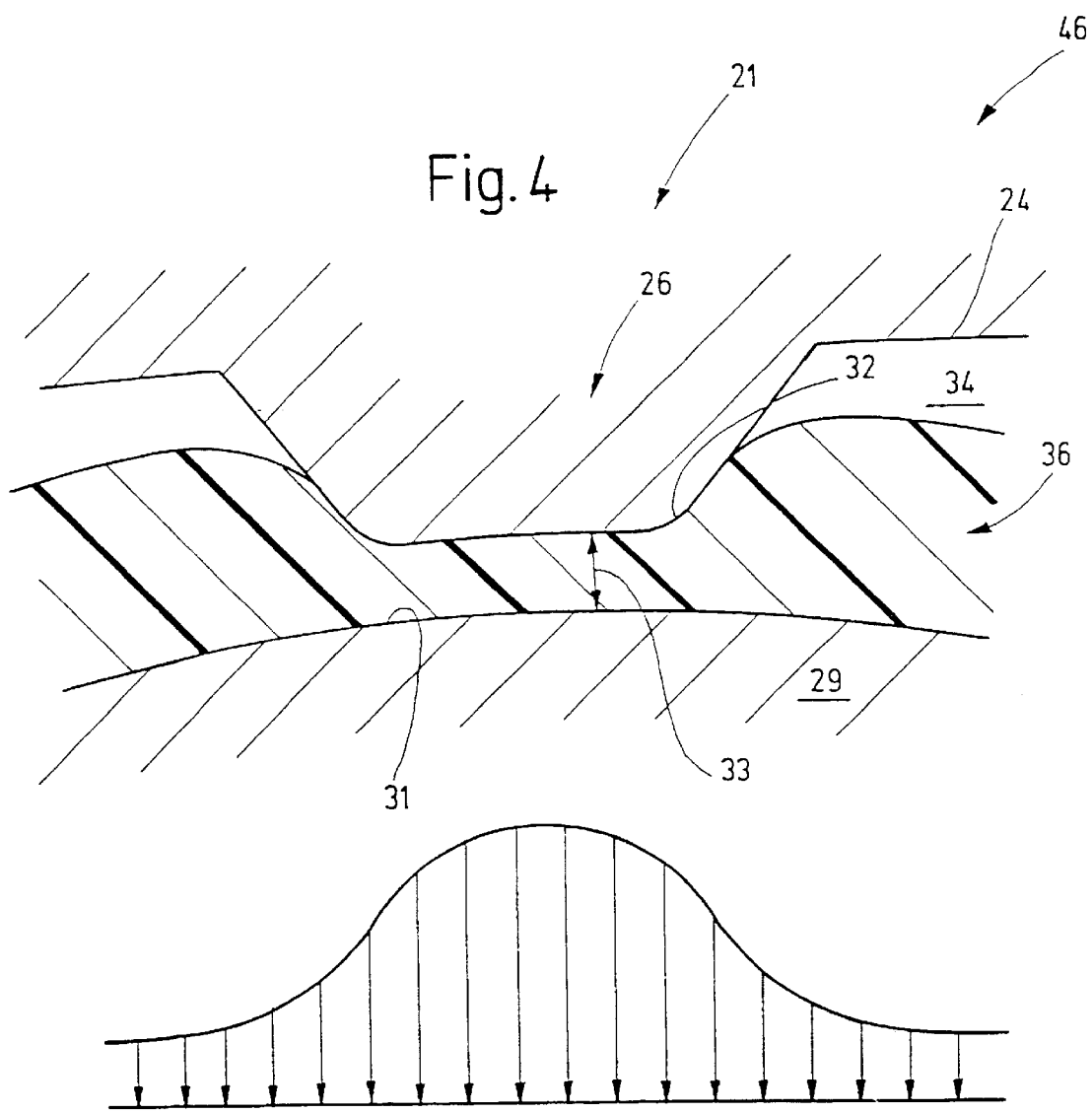
FIG. 4 is an enlarged fragmentary section of a portion of the bearing squeeze element and bearing seat shown in FIG. 3.
FIG. 5 is a diagrammatic depiction of the pressure distribution on the outer bearing ring in the vicinity of one of the pressure exerting ribs of the bearing seat shown in FIGS. 3 and 4.

The bearing seat 21 may have a prismatic or cylindrical internal shape. From the wall composed of curved or plane surface regions 24, 25, ribs 26 in this instance protrude radially upwardly. The ribs 26 are aligned parallel to a pivot axis 27 defined by the ball bearing 18. The ribs 26 in this case are identical to one another and are distributed at equal intervals around the circumferential wall of the bearing seat 21. Each rib 26 has an approximately trapezoidal cross section, as seen particularly in FIG. 4. The ball bearing 18 has a cylindrical outer ring 29, whose outer face 31 together with a striplike end faces 32 of the rib 26 oriented toward the outer ring 29, define a narrow gap 33. Between adjacent ribs 26, receiving chambers 34 are formed in which a gap defined between the surface region 24 (or 25) and the outer face 31 of the outer bearing ring 29 is markedly greater. Furthermore, as seen from FIG. 3, the spacing between adjacent ribs 26 is markedly greater than the width of an individual rib 26 while the illustrated end faces 32 are shown in FIG. 4 as narrow, striplike, substantially plane surface regions alternatively, the end faces 32 could be narrow edges that have a relatively short radius of curvature.

The end faces 32 are oriented parallel to the pivot axis 27, for example, and thus define a cylindrical outer shape, which is disposed concentrically to the pivot axis 27. Alternatively, the end faces 32 may also be inclined somewhat from the pivot axis 27 and thus define a conical outer shape.

Between the bearing seat 21 and the outer bearing ring 29 of the ball bearing 18, a squeeze element 36 is disposed, which is formed of a deformable material, preferably a material capable of resilient, yielding deformation, such as an elastomer. The squeeze element 36, in the present exemplary embodiment, is an annular element, which is seated on the cylindrical outer face 31 of the outer ring 29. It may be somewhat undersized, so that given a certain expansion it can rest with tension on the outer face 31. The width of the squeeze element 36 measured in the axial direction preferably matches the width of the outer bearing ring 29. In the radial direction, it has a thickness which is somewhat greater than the gap width 33, yet smaller than the spacing or gap formed between the wall 24 and the outer bearing face 31. The squeeze element 36 may also be formed by a band or by a plurality of pieces separated from one another.

As seen from FIG. 2, the shaft 4 is supported via the two spaced-apart ball bearings 18, 19, which are disposed in coaxial alignment with one another. To that end, the two housing parts 6, 7 are aligned with one another by aligning or centering means 41. The centering means 41 include a tubular extension 42, formed for instance on the lower housing part 7. This extension 42 is disposed concentrically with both the bearing seat 22 and the shaft 4 and extends through the interior of the housing 5 to the upper housing part 6. The latter has an annular collar 43, which extends toward the tubular extension 42, and is also disposed concentrically with the shaft 4. The lengths and diameter of the extension 42 and of the collar 43 are dimensioned such that the extension 42 engages the collar 43 with little or no play when the two housing parts 6, 7 are put one on the other and joined together. A certain axial play is possible. To make it easier for the extension 42 to find its way into the collar 43, the free end of the extension 42 may have a conical shape. In addition or as an alternative, the collar 43 may be provided with an introduction funnel. In this way, a centering device is formed that assures the alignment of the ball bearings 18, 19 even if the housing parts 6, 7 are subject to certain production variations. This can happen for instance if the housings are made by injection molding techniques, for instance of plastic.

The bearing seat 21, squeeze element 36 and ball bearing 18 form a bearing device 46, whose function is explained below:

When the housing 5 is put together, the extension 42 centers the lower housing part 7 relative to the housing part 6 so that the bearing seats 21, 22 are sufficiently aligned with one another. For further assembly, the roller bearings 18, 19 now each are provided with one squeeze element 36 and inserted axially into the bearing seats 21, 22. In the process, the ribs 26, which may have a funnel-like insertion bevel on their outward-pointing end, slide onto the squeeze element 26 and press into the initially cylindrically outside surface of the squeeze element, deforming it. There is enough room for the positively displaced material in the interstices between the ribs 26 so that the ball bearing 18 can slide unhindered into the receiving chamber surrounded by the bearing seat 21. The static friction between the squeeze element 36 and the outer face 31 prevents the squeeze element 36 from being pushed downward by the outer bearing ring 39. The friction between the squeeze element 36 and the ribs 26 is limited to small surface regions so that the static friction that occurs there is substantially less. The ball bearing 28 can therefore be easily inserted into the bearing seat 21. This is true regardless of the precise width of the gap 33. If shape of the deformations should lead to different gap widths along the circumference of the ball bearing 18, or if the gap widths increase or decrease by a few tenths of a millimeter, this has no effect on the seat of the ball bearing 18.

In any case, the outer bearing ring 29 is held nonrotatably in the bearing seat. It is secured against the squeeze element 36 by the large-area contact and the resultant static friction. As FIG. 5 shows, the squeeze element rests with radial tension on the outer face 31. The radial tension is locally increased in the region of the rib 26, but otherwise exists over the entire circumference of the outer ring 29, and as a result adequate static friction is generated.

In the installed state, the squeeze element 36 is secured with positive engagement against rotation relative to the bearing seat 21. The ribs 26 press into the squeeze element 36 so that with respect to a rotation, there is positive engagement, while with respect to an axial motion, there is frictional engagement.

The squeeze element 36 centers the ball bearing 18 in the bearing seat 21. Because of its elastic resilience, dimensional and shape deviations can be compensated for. If needed, the ribs 26 also may be designed such that the pivot axis of the ball bearing 18 is pivotable about relatively small angles. For instance, the ribs 26 may be crowned or curved toward the pivot axis; that is, the gap width 33 is then at a local minimum approximately in the center of the bearing.

Figure 6:
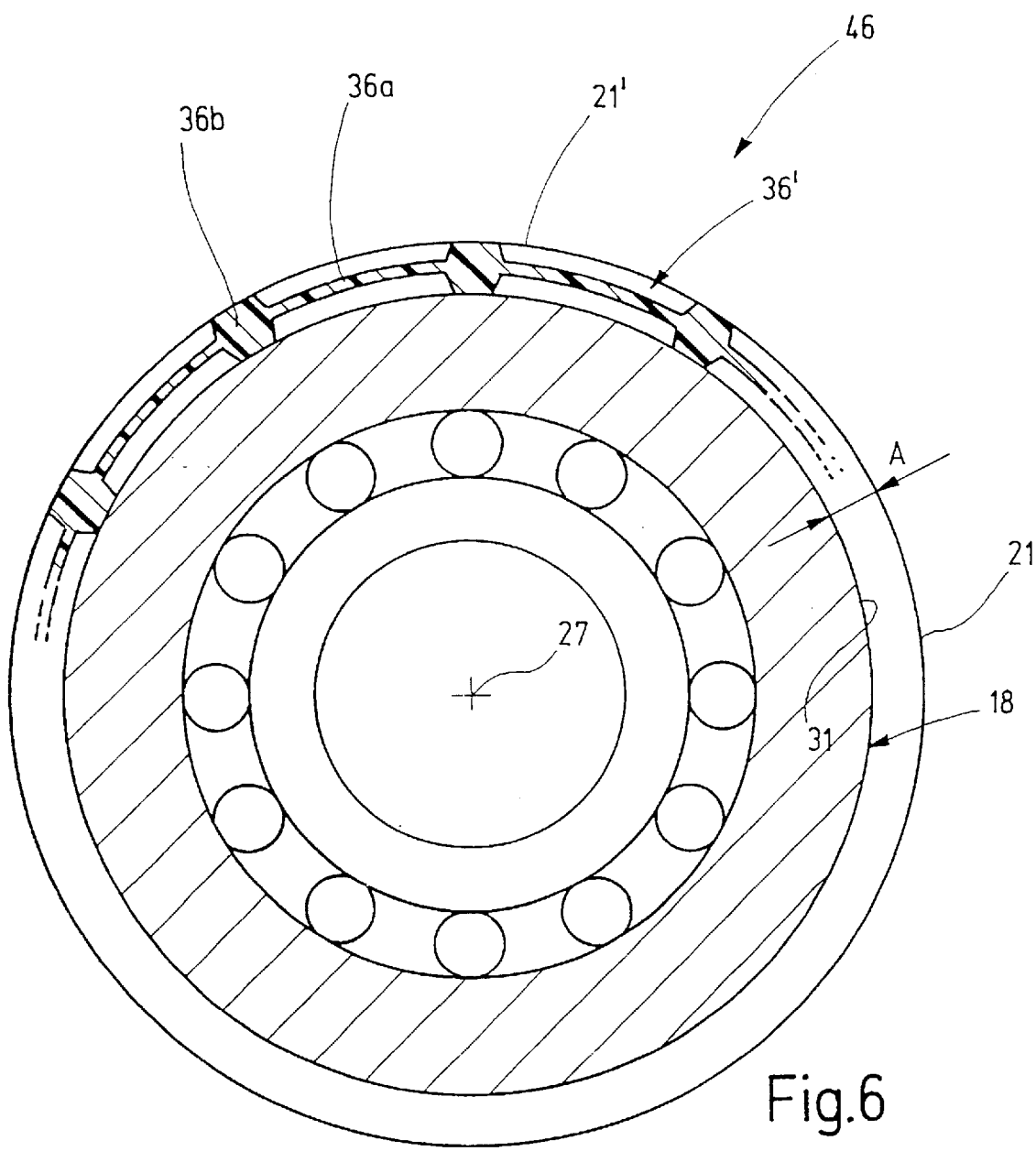
FIG. 6 is a transverse section of an alternative embodiment of bearing support in accordance with the invention.

In FIG. 6, a further embodiment of the bearing device 46 is shown, which deviates from the above-described embodiment with regard to the squeeze element 36 and the bearing seat 21. The elements are identified by the same reference numerals, each provided with an apostrophe to distinguish them.

Figure 7:
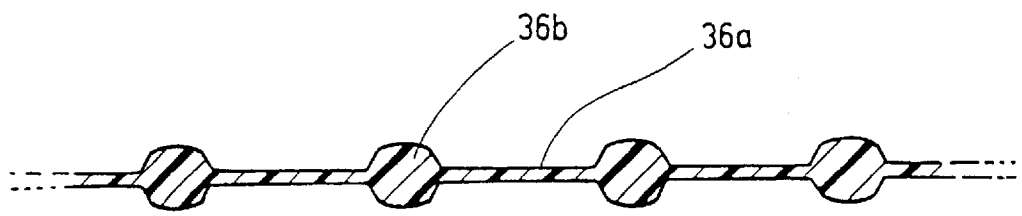
FIG. 7 is a fragmentary section of the squeeze element of the bearing shown in FIG. 6, in undeformed condition.

The squeeze element 36 which may have a striplike or annular form has an average thickness which is less than a spacing a between the bearing seat 21 and the outer face 31 of the roller bearing 18. Along the striplike basic body 36a, squeeze regions 36b are provided, spaced apart at equal intervals circumferentially, which as shown in FIG. 7, preferably have approximately circular cross sections in the relaxed state. The diameter of the cross section is greater than the spacing A (FIG. 6). The squeeze regions 36b therefore are deformed so that material of the squeeze element 36', which preferably is made of a polymer, is positively displaced laterally (in the circumferential direction). In the axial direction, the squeeze regions 36b are approximately rectilinear. They form axially extending ribs, which protrude to the inside and/or outside, on the squeeze element 36'. The bearing seat 21 has a substantially cylindrical or slightly conical inside surface, so as to tightly secure the roller bearing 18 upon axial insertion into the bearing seat 21.

Figure 8:
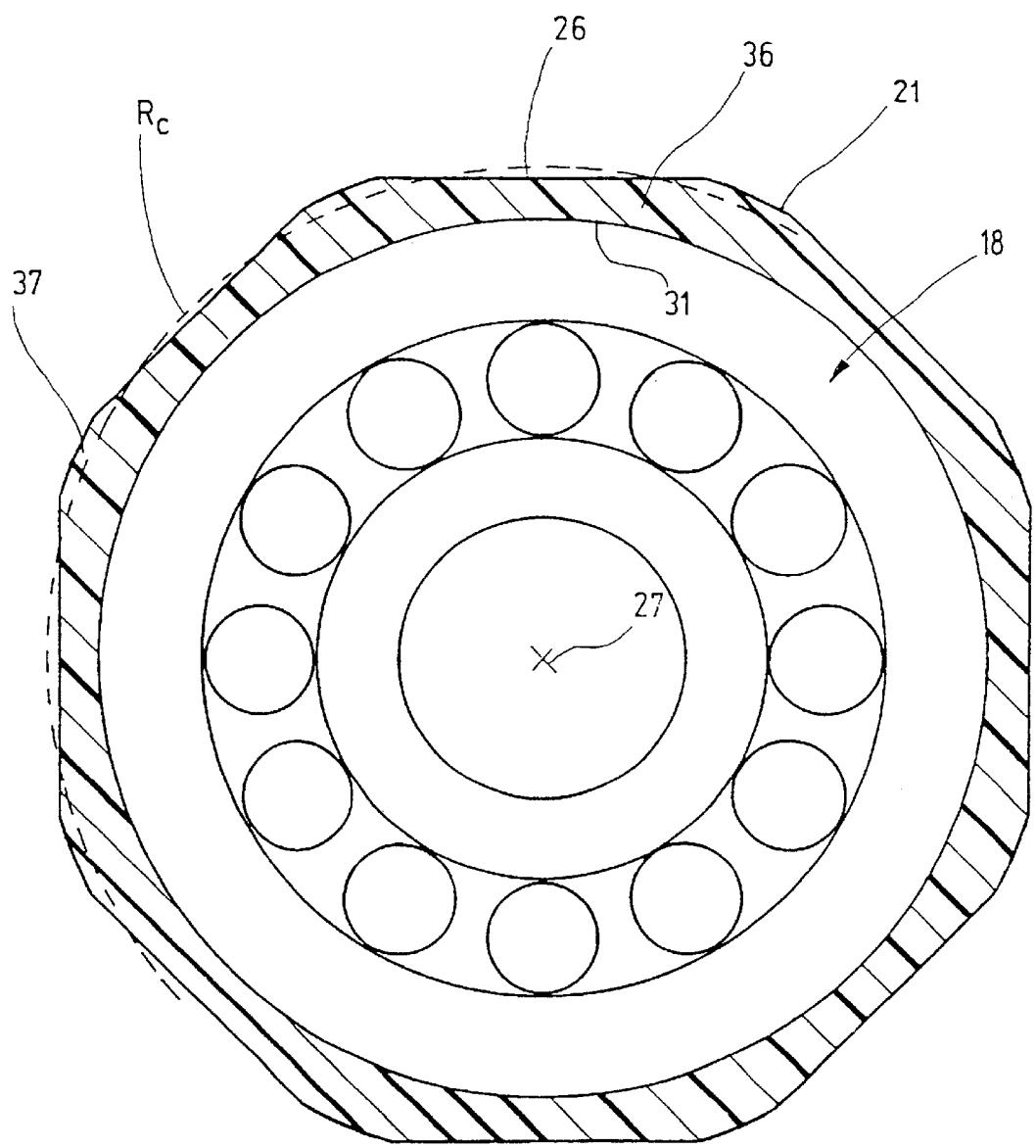
FIG. 8 is a transverse section of still a further alternative embodiment of bearing support in accordance with the invention.

A further-modified embodiment is shown in FIG. 8. The bearing seat 21 has a polygonal, for instance octagonal, contour having substantially planar surface regions 26. The spacing between the outer face 31 of the roller bearing 18 and the bearing seat 21 is narrowed at least approximately in the middle of each of these substantially plane surface regions 26 so that squeeze regions are created for the elastomer squeeze element 36. A relaxed radius $R_c$ of the squeeze element 3 is shorter than the least spacing from the inside surface of the bearing seat 21. At the corners of the polygonal bearing seat 21, the spacings are markedly greater, so that here receiving chambers are created for material 37 of the squeeze element 36 that is positively displaced laterally (circumferentially). In this embodiment, as in all the embodiments described above, the total volume of the chamber defined between the bearing seat 21 and the outer bearing face 31 is greater than the volume of the squeeze element 36. The average thickness of the squeeze element 36 is thus less than the average spacing between the inside face of the bearing seat 21 and the outside face 31 of the roller bearing 18. The squeeze element 36 spans the spacing and fills up the interstice regions. The chambers or spaces remaining at the corners of the bearing seat 21 are suitable for receiving the squeeze element 36 both in its original thickness and with an increased thickness as a consequence of the material 37 being positively displaced laterally.

From the foregoing, it can be seen that bearing device 46 is formed of a bearing seat 21, a roller bearing 18, and a squeeze element 36. The squeeze element rests over a large surface area on the outer ring of the roller bearing 18 and rests only regionally on corresponding regions of the bearing seat 26. The regions are preferably linear or striplike and are oriented substantially axially. This facilitates the insertion and removal of the roller bearing 18 into and Out of the bearing seat 21 and prevents rotation of the outer bearing ring even if the bearing seats 21 are provided with relatively generous tolerances.

What is claimed is:

1. A yarn feeder comprising a housing, a yarn guide drum, a shaft upon which said yarn guide drum is mounted, a plurality of bearing devices within said housing for rotatably supporting said shaft, said bearing devices having a substantially cylindrical outer surface (31);

said housing having a non-divided bearing seat (21) for each bearing device which defines a receiving chamber, axially open toward one side, for the bearing device and a space between the bearing device (18) and the bearing seat (21); and a squeeze element (36) made from an elastomer and disposed in the space between each bearing device (18) and the bearing seat (21), one of said squeeze element (36) and bearing seat (21) for each bearing device having an irregular surface adjacent a surface of the other of said squeeze element (36) and bearing seat (21) that define a plurality of circumferentially spaced squeeze zones in which the squeeze element is compressible and deformable to equalize misalignment of the housing bearing seats so that the shaft rotatably supported by the bearing devices will rotate freely even if tolerance variations prevent precise alignment of the bearing seats, and said adjacent surfaces of the squeeze element (36) and bearing seat (21) of each bearing device further defining respective displacement chambers circumferentially adjacent each squeeze zone into which the squeeze element (36) can be displaced as an incident to deformation in the squeeze zone.

2. The yarn feeder of claim 1 in which said housing is made of plastic.

3. The yarn feeder of claim 1 in which each said squeeze element (36) is a closed ring.

4. The yarn feeder of claim 1 in which each said squeeze element has a radial thickness greater than a radial spacing between the outer surface (31) of the roller bearing and an opposed face (32) of the bearing seat (21).

5. The yarn feeder of claim 1 in which each said squeeze element (36) has an annular shape.

6. The yarn feeder of claim 5 in which each said squeeze element has regions, distributed along its circumference, that have a greater thickness than regions therebetween.

7. The yarn feeder of claim 6 in which each said bearing seat (21) has a cylindrical face.

8. A bearing device (46) comprising a housing (5), a shaft (4) carried by said housing, at least one ball bearing (18) supporting said shaft for rotatable movement about a concentric pivot axis (27), said bearing having a substantially cylindrical outer surface (31);

said housing having a non-divided bearing seat (21) which defines a receiving chamber, axially open toward one side, for the roller bearing (18) and a space between the roller bearing (18) and the bearing seat (21); and a squeeze element (36) made from an elastomer and disposed in the space between said ball bearing (18) and the bearing seat (21), and said bearing seat (21) having ribs extending substantially parallel to the pivot axis (21) that define squeeze zones in which said squeeze element (36) is compressed, causing deformation of its cross section.

9. The bearing device of claim 8 in which a radial spacing between the outer surface (31) of the roller bearing (18) and radial inwardly directed faces of the ribs (26) is constant in the axial direction.

10. The bearing device of claim 8 in which a radial spacing between the outer surface (31) of the roller bearing (18) and radially inwardly directed faces (32) of the ribs (26) decreases in the axial direction.

11. The bearing device of claim 10 in which said ribs (26) are circumferentially spaced apart a distance of at least 5 times a circumferential width of the rib.

12. The bearing device of claim 8 in which said ribs (26) have curved radially inwardly directed faces.

13. The bearing device of claim 8 in which said ribs have a trapezoidal cross section.

14. A bearing device (46) comprising a housing (5), shaft (4) carried by said housing, at least one ball bearing (18) supporting said shaft for rotatable movement about a concentric pivot axis (27), said bearing having a substantially cylindrical outer surface (31);

said housing having a non-divided bearing seat (21) which defines a receiving chamber, axially open toward one side, for the roller bearing (18) and a space between the roller bearing (18) and the bearing seat (21); and a squeeze element (36) made from an elastomer and disposed in the space between the roller bearing (18) and the bearing seat (21), and said bearing seat (21) and ball bearing (18) defining a plurality of circumferentially spaced squeezed zones circumferentially spaced by respective displacement chambers each having a greater radial width than the squeeze zones in which said squeeze element (36) is compressed, causing deformation of its cross section.

15. The bearing device of claim 14 in which said ribs (26) are circumferentially spaced apart from each other a distance greater than the circumferential width of the rib.

16. The bearing device of claim 14 in which said displacement chambers are of a size such that applicable portions of the squeeze element (46) and any additionally deformed portions thereof from the squeeze zones are received without being squeezed.

17. The bearing device of claim 14 in which said squeeze zones are uniformly spaced from each other.

18. A yarn feeder comprising a plastic housing, a yarn guide drum, a shaft upon which said yarn guide drum is mounted, a plurality of bearing devices within said housing for rotatably supporting said shaft, said bearing devices having a substantially cylindrical outer surface (31);

said housing having a non-divided bearing seat (21) for each bearing device which defines a receiving chamber, axially open toward one side, for the bearing device and a space between the bearing device (18) and the bearing seat (21);

a squeeze element (36) made from an elastomer and disposed in the space between each bearing device (18) and the bearing seat (21), said squeeze element (36) for each bearing device comprising squeeze zones having a greater thickness than the space between the bearing device (18) and bearing seat (21) and squeeze element deformation receiving zones adjacent each squeeze zone having a thickness less than the spacing between each bearing device (18) and bearing seat (21), and said squeeze elements being compressible and deformable to equalize misalignment of the bearing seats within the housing so that the shaft rotatably supported by the bearing devices will rotate freely even if tolerances prevent concise axial alignment of the bearing seats.

19. The yarn feeder of claim 18 in which said housing comprises two plastic housing parts, one of said bearing seats being located in one housing part and a second of said bear seats is located in the other of said housing parts.

20. A yarn feeder comprising a housing, a yarn guide drum, a shaft upon which said yarn guide drum is mounted, bearing devices within said housing for rotatably supporting said shaft, said bearing devices having a substantially cylindrical outer surface (31);

said housing having a non-divided bearing seat (21) for each bearing device which defines a receiving chamber, axially open toward one side, for the bearing device and a space between the bearing device (18) and the bearing seat (21); and a squeeze element (36) made from an elastomer and disposed in the space between each bearing device (18) and the seat (21), and said squeeze element (36) being compressed at circumferentially spaced-apart points, causing deformation of its cross section.

21. The yarn feeder of claim 20 in which said housing comprises a plurality of housing part (6, 7) and said bearing devices (46) are disposed on different of said housing parts (6, 7).

22. The yarn feeder of claim 21 in which the bearing seats (21, 22) of the bearing devices each have a centering device (41) formed by a tubular extension (42) protruding into a collar (43).

23. A bearing device (46) comprising a housing (5), a shaft (4) carried by said housing, at least one ball bearing (18) supporting said shaft for rotatable movement about a concentric pivot axis (27), said bearing having a substantially cylindrical outer surface (31);

said housing having a non-divided bearing seat (21) which defines a receiving chamber, axially open toward one side, for the roller bearing (18) and a space between the roller bearing (18) and the bearing seat (21); and an annular squeeze element (36) made from an elastomer and disposed in the space between the roller bearing (18) and the bearing seat (21), and said squeeze element (36) having a uniform thickness over its entire circumferential area and being compressed at circumferentially spaced-apart points, causing deformation of its cross section.

24. A bearing device (46) comprising a housing (5), a shaft (4) carried by said housing, at least one ball bearing (18) supporting said shaft for rotatable movement about a concentric pivot axis (27), said bearing having a substantially cylindrical outer surface (31);

said housing having a non-divided bearing seat (21) which defines a receiving chamber, axially open toward one side, for the roller bearing (18) and a space between the roller bearing (18) and the bearing seat (21); and a squeeze element (36) made from an elastomer and disposed in the space between the roller bearing (18) and the bearing seat (21), and said bearing seat (21) having regions that have a lesser spacing from the roller bearing (18) than other regions located therebetween for defining circumferentially spaced squeeze zones in which said squeeze element (36) is compressed, causing deformation of its cross section.

* * * * *